(12) United States Patent
Yokoyama

(10) Patent No.: US 11,516,209 B2
(45) Date of Patent: Nov. 29, 2022

(54) INFORMATION PROCESSING APPARATUS AND METHOD FOR CONTROLLING INFORMATION PROCESSING APPARATUS

(71) Applicant: TOSHIBA TEC KABUSHIKI KAISHA, Tokyo (JP)

(72) Inventor: Kenji Yokoyama, Izu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 153 days.

(21) Appl. No.: 16/995,657

(22) Filed: Aug. 17, 2020

(65) Prior Publication Data

US 2021/0306318 A1    Sep. 30, 2021

(30) Foreign Application Priority Data

Mar. 25, 2020   (JP) .............................. JP2020-053662

(51) Int. Cl.
| | |
|---|---|
| G06F 21/00 | (2013.01) |
| H04L 9/40 | (2022.01) |
| H04L 67/02 | (2022.01) |
| G06F 9/451 | (2018.01) |
| H04N 1/44 | (2006.01) |

(52) U.S. Cl.
CPC ............ *H04L 63/083* (2013.01); *G06F 9/451* (2018.02); *H04L 63/0853* (2013.01); *H04L 63/102* (2013.01); *H04L 67/02* (2013.01); *H04N 1/4413* (2013.01)

(58) Field of Classification Search
CPC . H04L 63/083; H04L 63/0853; H04L 63/102; H04L 67/02; H04L 63/0807; G06F 9/451; H04N 1/4413
See application file for complete search history.

(56) References Cited

U.S. PATENT DOCUMENTS

| | | | |
|---|---|---|---|
| 9,338,007 B1* | 5/2016 | Doshi ................. | H04L 63/0815 |
| 10,242,214 B2* | 3/2019 | Gadepalli ............. | G06F 21/316 |
| 2007/0223031 A1 | 9/2007 | Kitada et al. | |
| 2017/0094514 A1* | 3/2017 | Kelts ................... | H04L 63/0853 |
| 2018/0351958 A1* | 12/2018 | Sakurai ................ | H04L 63/102 |

FOREIGN PATENT DOCUMENTS

JP          2017-037469 A       2/2017

* cited by examiner

*Primary Examiner* — Kendall Dolly
(74) *Attorney, Agent, or Firm* — Foley & Lardner LLP

(57) ABSTRACT

An image forming apparatus includes a communication interface, a processor, and a memory. The communication interface communicates with an external service including an authorization code flow. The memory stores a front-end application having a UI and a back-end application having no UI and registered in the external service, which are programs executed by the processor. The processor causes the external service to execute the authorization code flow based on the information of the back-end application in response to a request from the front-end application, receives an authorization code from the external service, causes the front-end application to redirect using a URL previously associated with the back-end application on the external service, and acquires an access token from the external service by the back-end application using the authorization code.

15 Claims, 3 Drawing Sheets

INFORMATION PROCESSING APPARATUS AND METHOD FOR CONTROLLING INFORMATION PROCESSING APPARATUS

CROSS-REFERENCE TO RELATED APPLICATION

This application is based upon and claims the benefit of priority to Japanese Patent Application No. 2020-053662, filed Mar. 25, 2020, the entire contents of which are incorporated herein by reference.

FIELD

Embodiments described herein relate generally to an information processing apparatus and a method for controlling the information processing apparatus.

BACKGROUND

Conventionally, a built-in application that cooperates with an external service (such as OAuth) with an authorization code flow is installed in an information processing apparatus. Such a built-in application is configured by integrating main functions, control of the authorization code flow, control of external services, and the like. The built-in application includes a back-end application that does not have a user interface (UI), a front-end application that has a UI and has a function that the end user directly operates.

DETAILED DESCRIPTION

In a conventional system, a front-end application includes a configuration for controlling the authorization code flow in response to the specifications of the external service. Therefore, the front-end application needs to have a configuration for controlling the authorization code flow for each external service. In other words, there is a problem that a part of the configuration of the front-end application is determined based on the specifications of the external service, which lacks versatility.

The exemplary embodiments disclosed herein provide a highly convenient information processing apparatus and a method for controlling the information processing apparatus. In general, according to an embodiment, an image forming apparatus includes a communication interface, a processor, and a memory. The communication interface communicates with an external service including an authorization code flow. The memory stores a front-end application having a UI and a back-end application having no UI and registered in the external service, which are programs executed by the processor. The processor causes the external service to execute the authorization code flow based on the information of the back-end application in response to a request from the front-end application, receives an authorization code from the external service, causes the front-end application to redirect using a URL previously associated with the back-end application on the external service, and acquires an access token from the external service by the back-end application using the authorization code.

Hereinafter, embodiments will be described in further detail with reference to the drawings.

Figure 1:
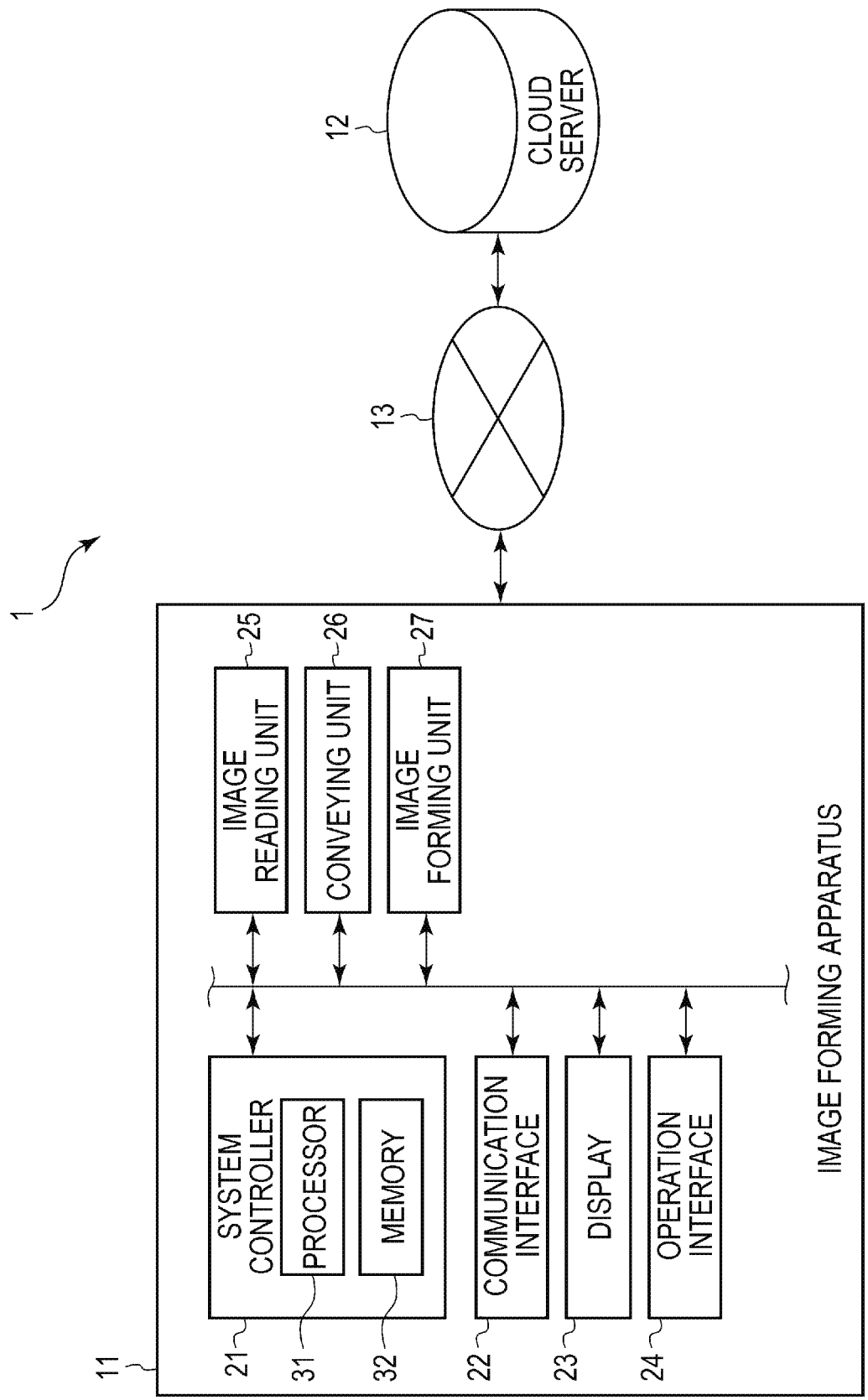
FIG. 1 is a diagram for describing a configuration example of an image forming apparatus according to at least one embodiment.

FIG. 1 is an explanatory diagram for describing an example of an information processing system 1 according to an embodiment.

As illustrated in FIG. 1, the information processing system 1 includes an image forming apparatus 11 and a cloud server 12 that provides an external service. The image forming apparatus 11 and the cloud server 12 are connected to each other via a network 13 such as a public line. The information processing system 1 is a system in which the image forming apparatus 11 transmits information to the cloud server 12, executes processing based on the information received by the cloud server 12, and transmits the processing result to the image forming apparatus 11.

The image forming apparatus 11 is, for example, a multifunction printer (MFP) that performs various types of processing such as image formation while conveying a recording medium such as a printing medium. The image forming apparatus 11 is, for example, a solid scanning type printer (for example, an LED printer) that scans an LED array for performing various types of processing such as image formation and the like while conveying the recording medium such as a printing medium. In some embodiments, the image forming apparatus 11 may be an inkjet type printer (e.g., an inkjet printer) that scans an ink jet head for ejecting ink, or another type of printer.

The image forming apparatus 11 forms an image on the printing medium with toner. Further, the image forming apparatus 11 acquires an image (e.g., image data) of a paper sheet by optically reading the paper sheet. In addition, the image forming apparatus 11 can transmit the acquired or generated file (e.g., image data, document file, or the like) to the cloud server 12 via the network 13. The image forming apparatus 11 is not limited to transmitting information to the cloud server 12, and can transmit information to various external service providing servers.

The cloud server 12 is a server device including a processor, a memory, and a communication interface. The cloud server 12 performs various types of processing by the processor executing programs in the memory. For example, when the cloud server 12 receives a file from the image forming apparatus 11, the cloud server 12 functions as a cloud storage that stores the received file. In other words, the cloud server 12 can provide a service (e.g., an external service) to the image forming apparatus 11 that is a client.

The cloud server 12 authorizes the client by executing the authorization code flow based on OAuth. The cloud server 12 can provide the above-described external service to the client to which the authorization is normally performed and the access token is issued. The cloud server 12 may be separately configured with a device that executes the authorization code flow and a device that provides an external service to the client.

First, the configuration of the image forming apparatus 11 will be described.

The image forming apparatus 11 includes a system controller 21, a communication interface 22, a display 23, an operation interface 24, an image reading unit (e.g., an image reader) 25, a conveying unit (e.g., a conveyor) 26, and an image forming unit 27. The system controller 21, the communication interface 22, the display 23, the operation interface 24, the image reading unit 25, the conveying unit 26, and the image forming unit 27 are accommodated in a housing (not illustrated).

The system controller 21 controls the image forming apparatus 11. The system controller 21 includes, for example, a processor 31 and a memory 32.

The processor 31 is an arithmetic element (for example, a central processing unit, or CPU) that executes arithmetic processing. The processor 31 is a main body of the operation of the system controller 21. The processor 31 performs various types of processing based on data of a program or the like stored in the memory 32. The processor 31 functions as a control unit capable of executing various operations by executing the program stored in the memory 32.

The memory 32 is a storage device that stores programs and data used by the programs. Further, the memory 32 temporarily stores data and the like being processed by the processor 31. The memory 32 is configured as a non-volatile memory.

The communication interface 22 is an interface for communicating with a client device or the like that supplies a print job via a network. Further, the communication interface 22 transmits and receives various pieces of information to and from the cloud server 12 via the network 13.

The display 23 displays a screen in response to a video signal input from a display control unit such as the system controller 21 or a graphic controller (not illustrated). For example, the display 23 displays a screen for various settings of the image forming apparatus 11. Further, the display 23 displays a screen that corresponds to various applications stored in the memory 32 of the image forming apparatus 11.

The operation interface 24 has various operation members. The operation interface 24 supplies an operation signal that corresponds to the operation of the operation member to the system controller 21. The operation member is, for example, a touch sensor, a numeric keypad, a power key, a paper sheet feed key, various function keys, or a keyboard. The touch sensor is, for example, a resistor film type touch sensor, a static capacitance type touch sensor, or the like. The touch sensor acquires information indicating a designated position within a region. The touch sensor is configured as a touch panel integrated with the display 23, and accordingly, the touch sensor inputs a signal indicating the touched position on the screen displayed on the display 23 to the system controller 21.

The image reading unit 25 is configured to read an image from paper sheets. The image reading unit 25 includes, for example, a scanner and an automatic document feeder (ADF). The image reading unit 25 can acquire an image by the scanner while passing the paper sheet to the reading position of the scanner by the ADF. In some embodiments, the image reading unit 25 can acquire an image from the paper sheets arranged on a glass plate while moving the scanner.

The conveying unit 26 is configured to supply a medium for printing (printing medium) to the image forming unit 27 and discharge the printing medium on which the image is formed by the image forming unit 27 from the housing (e.g., a conveyor). The conveying unit 26 supplies (e.g., conveys or feeds) the printing media accommodated in a paper feed cassette (not illustrated) that accommodates the printing medium to the image forming unit 27 one by one. Further, the conveying unit 26 discharges the printing medium on which the image is formed by the image forming unit 27 to a paper discharge tray outside the housing.

The image forming unit 27 forms an image on the printing medium based on the control of the system controller 21. In some embodiments, the image forming unit 27 includes a photosensitive drum, an electrostatic charger, an exposing device, a developing device, a transfer mechanism, and a fixing device. The image forming unit 27 charges the photosensitive drum using the electrostatic charger, and irradiates the photosensitive drum with light that corresponds to the image data for printing by the exposing device. Accordingly, an electrostatic latent image is formed on the photosensitive drum. The image forming unit 27 attaches toner to the latent image formed on the photosensitive drum by the developing device, and transfers the toner attached to the latent image to the printing medium by the transfer mechanism. The image forming unit 27 fixes the toner image onto the printing medium by applying heat and pressure to the printing medium onto which the toner is transferred by the fixing device.

The image forming unit 27 may include a photosensitive drum, an electrostatic charger, an exposing device, and a developing device for each color of toner. The toner color is, for example, cyan (C), magenta (M), yellow (Y), black (K), or the like. The image forming unit 27 forms a color image on the medium by fixing the toner images of CMYK colors on the medium.

Next, various applications stored in the memory 32 will be described.

Figure 2:
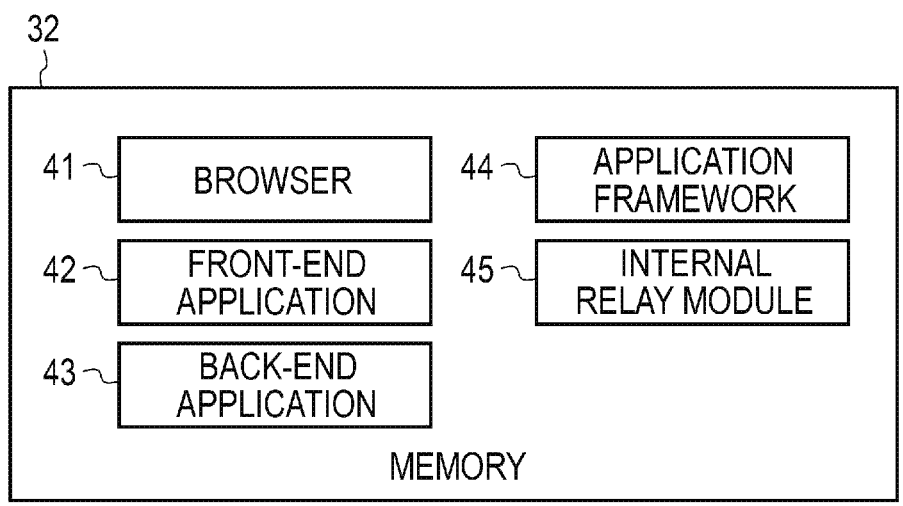
FIG. 2 is a diagram for describing a configuration example of a memory according to at least one embodiment.

FIG. 2 is an explanatory diagram for describing examples of various applications stored in the memory 32. As illustrated in FIG. 2, a browser 41, a front-end application 42, a back-end application 43, an application framework 44, and an internal relay module 45 are stored in the memory 32. The browser 41, the front-end application 42, the back-end application 43, the application framework 44, and the internal relay module 45 are configured to cause the cloud server 12 to provide an external service.

The browser 41 is an application that renders a file to display a screen for browsing on the display 23.

The application framework 44 is a program for controlling activation or the like of each application in the memory 32.

The front-end application 42 is an application that requests execution of any function. The front-end application 42 has a UI for being directly operated by an end user. For example, the front-end application 42 requests the back-end application 43 to save the file in the external service in response to an operation requested by the end user.

The back-end application 43 is an application that executes processing that corresponds to a request from the front-end application 42. The back-end application 43 is an application that does not have a UI and cannot be directly operated by the end user. For example, when the front-end application 42 requests the back-end application 43 to save the file in the external service, the back-end application 43 determines the external service in which to save the file and saves the file in the external service. For example, the back-end application 43 is preset for each external service, such as for service A and service B.

The internal relay module 45 is an application that performs pre-processing and post-processing of the authorization code flow, which will be described later.

As described above, the cloud server 12 executes the authorization code flow based on OAuth and issues the access token to the client. When the cloud server 12 receives a request for a service including the access token, the cloud server 12 executes processing that corresponds to the request. Therefore, various pieces of information are registered in the external service of the cloud server 12. Further, various pieces of information that correspond to the specifications of the external service are registered in various applications on the memory 32.

The application framework 44 is associated with the back-end application 43, and predefines a redirect URL registered in the external service. The redirect URL is a URL used in the post-processing of the authorization code flow. In some embodiments, the URL of the internal relay module is used as the redirect URL.

The application framework 44 also predefines the authorization code flow completion URL of the internal relay module 45. The authorization code flow completion URL is a URL for notifying the front-end application 42 of the completion of the authorization code flow.

The application framework 44 is configured to include an identifier of the back-end application 43 as a parameter, and may not include the identifier of the front-end application 42.

The back-end application 43 registers the redirect URL in advance in the external service with the authorization code flow.

Further, the back-end application 43 registers the client secret ID (simply referred to as client ID) in advance in the external service with the authorization code flow.

The back-end application 43 registers an authorization code flow start URL and the client ID in advance in, for example, a meta property. The authorization code flow start URL is a URL for transmitting an authentication request to the external service, and conforms to the specification of the authorization code flow of the external service.

Next, the authorization code flow for various applications stored in the memory 32 will be described.

Figure 3:
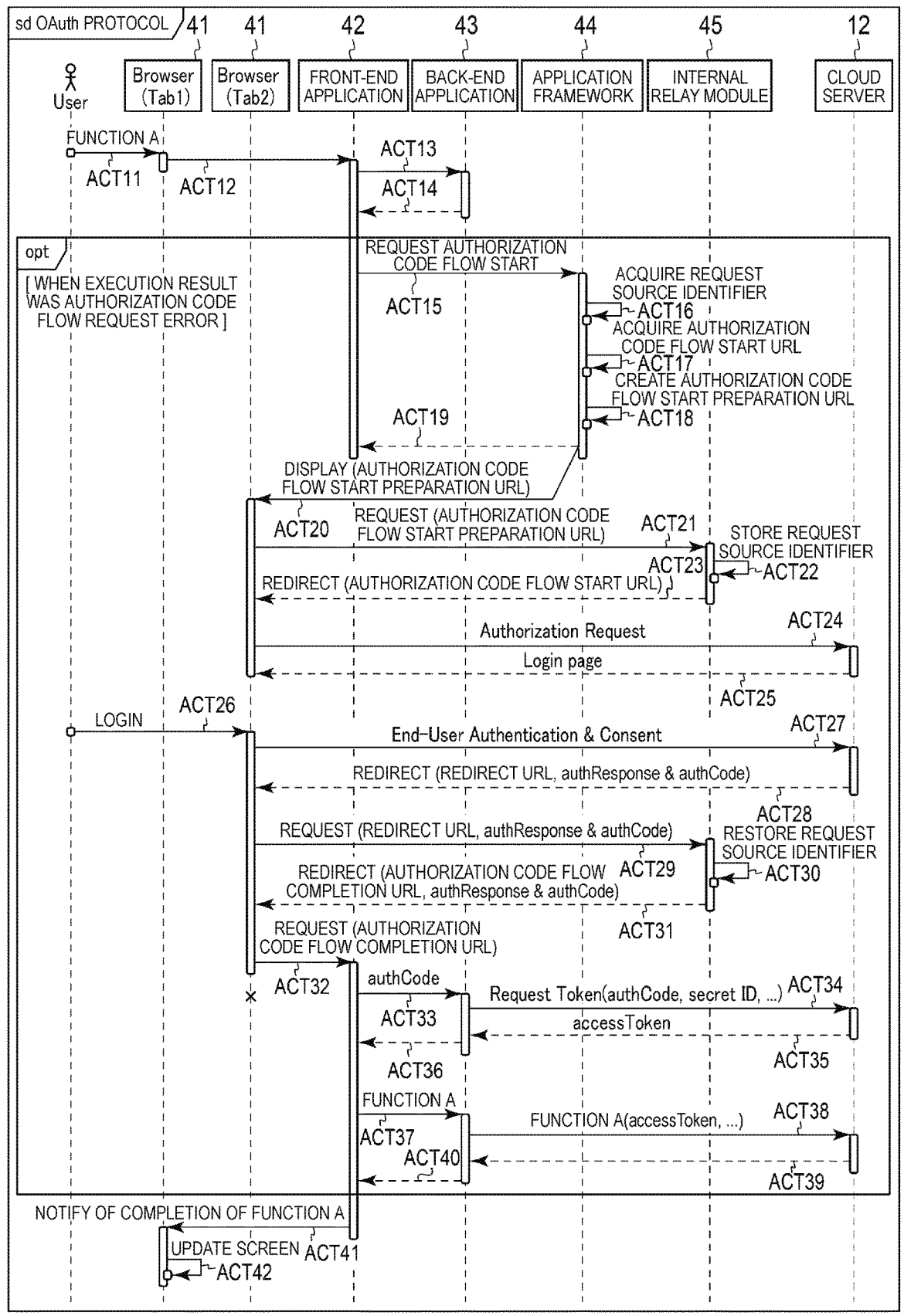
FIG. 3 is a diagram for describing an example of an operation according to at least one embodiment.

FIG. 3 is a sequence diagram describing processing configured to cause the external service to execute a function A. The processor 31 executes various types of processing by executing the browser 41, the front-end application 42, the back-end application 43, the application framework 44, and the internal relay module 45, all of which are stored in the memory 32. In addition, between the applications (e.g., between the processes), data is picked up by, for example, an inter-application communication API (application programming interface) or some other method.

First, the end user operates the operation interface to select execution of the function A on a screen (Tab1) displayed by the browser 41 (ACT 11).

When the execution of the function A is selected on the screen, the browser 41 requests the front-end application 42 to execute the function A (ACT 12).

When the front-end application 42 is requested to execute the function A by the browser 41, the front-end application 42 requests the back-end application 43 to execute the function A (transmits a function execution request) (ACT 13).

When receiving the request to execute the function A from the front-end application 42, the back-end application 43 confirms whether or not the access token of the external service corresponding to the function A is acquired. When the back-end application 43 did not acquire the access token of the external service corresponding to the function A, the back-end application 43 requests the external service to execute the authorization code flow, and transmits information indicating that the access token needs to be acquired, to the front-end application 42 as the execution result (ACT 14). In other words, the back-end application 43 notifies the front-end application 42 of the necessity of the authorization code flow.

When the front-end application 42 requests the external service to execute the authorization code flow and determines that the access token needs to be acquired, the front-end application 42 outputs an authorization code flow start request (ACT 15). The front-end application 42 sets in advance which back-end application 43 to cooperate with in response to the external service of the function A. When the authorization code flow needs to be executed, the front-end application 42 designates an identifier (an identifier of the back-end application) for specifying the back-end application 43, and outputs an authorization code flow start request to the application framework 44.

When receiving the authorization code flow start request from the front-end application 42, the application framework 44 acquires the identifier of the front-end application 42, which is a request source (ACT 16).

Further, the application framework 44 acquires the authorization code flow start URL from the meta property of the back-end application 43 designated by the authorization code flow start request (ACT 17).

Further, the application framework 44 designates the identifier of the front-end application 42 and the authorization code flow start URL, and generates an authorization code flow start preparation URL of the internal relay module 45 (ACT 18). In addition, the application framework 44 also incorporates or associates the identifier of the back-end application 43 designated by the front-end application 42 into the authorization code flow start preparation URL.

The application framework 44 notifies the front-end application 42 that the pre-processing of the authorization code flow will be performed (ACT 19). Further, the application framework 44 causes a screen (Tab2) displayed by the browser 41 to display a screen that corresponds to the authorization code flow start preparation URL (ACT 20). In other words, the application framework 44 acquires information for connection from the back-end application 43 and causes the browser 41 to display the information.

The browser 41 requests the authorization code flow start preparation URL from the internal relay module 45 (ACT 21). This request includes the identifier of the front-end application 42.

When the authorization code flow start preparation URL is requested, the internal relay module 45 stores the identifier of the request source, that is, the identifier of the front-end application 42, in a predetermined region (in a session state) in the memory 32 (ACT 22).

The internal relay module 45 performs a redirect including the authorization code flow start URL to the browser 41 (ACT 23). Accordingly, the browser 41 can display a screen that corresponds to the authorization code flow start URL on Tab2.

The above-described ACT 21 to ACT 23 are processing at a stage before a login screen is displayed on the display 23. During the above-described ACT 21 to ACT 23, the internal relay module 45 can store the state of the front-end application 42 before displaying the login screen in the memory 32.

When receiving the redirect including the authorization code flow start URL from the internal relay module 45, the browser 41 transmits an authorization request to the cloud server 12 that provides the external service (ACT 24).

The cloud server 12 transmits a login page to the browser 41 in response to the authentication request (ACT 25).

When the login page is displayed on the display 23 by the browser 41, the end user performs a login operation based on the operation of the operation interface 24 (ACT 26). Here, the login ID and password for the external service are input.

The browser 41 transmits End-User Authentication & Consent (authentication information including a login ID and password) to the cloud server 12 that provides the input external service (ACT 27).

The cloud server 12 performs authentication in response to End-User Authentication & Consent, and when the authentication is approved (e.g., is OK), the cloud server 12 causes the browser 41 to redirect (ACT 28). When the authentication is OK, the cloud server 12 transmits the redirect URL, the authResponse (authentication response), and the authCode (authorization code) which are registered in association with the back-end application 43, to the browser 41.

As described above, the redirect URL is a URL of the internal relay module 45. Therefore, the browser 41 transmits the authentication response and the authorization code to the internal relay module 45 based on the redirect URL transmitted from the cloud server 12, and requests the authorization code flow completion URL (ACT 29).

When the authorization code flow completion URL is requested, the internal relay module 45 restores a request source identifier (ACT 30). In other words, the internal relay module 45 acquires the identifier of the front-end application 42 stored in the session on the memory 32 by ACT 22.

The internal relay module 45 notifies the front-end application 42 indicated by the identifier of the completion of the authorization code flow via the browser 41. Specifically, the internal relay module 45 transmits the authentication response and the authorization code sent from the external service and the authorization code flow completion URL to the browser (ACT 31). The browser 41 transmits the authorization code and the authorization code flow completion URL to the front-end application 42 (ACT 32).

When the completion of the authorization code flow is notified from the internal relay module 45, that is, when the authorization code and the authorization code flow completion URL are received from the browser 41, the front-end application 42 notifies the back-end application 43 of the completion of the authorization code flow (ACT 33). In other words, the front-end application 42 can receive the authorization code and the authorization code flow completion URL from the internal relay module 45 when the authorization code flow start request is output to the back-end application 43 in ACT 15.

When the completion of the authorization code flow is notified from the front-end application 42, the back-end application 43 requests an access token from the external service of the cloud server 12 (ACT 34). In other words, the back-end application 43 transmits the access token request to the external service of the cloud server 12. The access token request includes the authorization code and the client ID (client secret ID) registered in advance.

When receiving the access token request, the cloud server 12 determines whether or not the access token request is valid. The cloud server 12 determines whether or not the authorization code of the access token request and the client ID registered in advance are authorized. When it is determined that the access token request is valid, the cloud server 12 issues an access token to the back-end application 43 (ACT 35).

When receiving the access token from the cloud server 12, the back-end application 43 notifies the front-end application 42 that the access token is issued (ACT 36). After this, when the back-end application 43 is requested to execute the function A from the front-end application 42 (ACT 37), the back-end application 43 can request the external service to execute the function A (ACT 38). In this case, the back-end application 43 transmits the request to execute the function A and the access token to the cloud server 12.

When the access token and the request to execute the function A are received, the cloud server 12 executes the function A and notifies the back-end application 43 of the execution result (ACT 39).

When receiving the execution result of the function A from the cloud server 12, the back-end application 43 notifies the front-end application 42 of the execution result of the function A (ACT 40).

When the front-end application 42 receives the execution result of the function A, the completion of the function A is notified to the browser 41 (ACT 41) and causes the browser 41 to update the screen (ACT 42) to notify the end user of the completion of the function A.

As described above, the image forming apparatus 11 as the information processing apparatus includes the communication interface 22, the processor 31, and the memory 32. The communication interface 22 is configured to communicate with the external service including the authorization code flow. The memory 32 stores the front-end application 42 having a UI and the back-end application 43 having no UI and registered in the external service, which are programs executed by the processor 31. In response to a request from the front-end application 42, the processor 31 causes the external service to execute the authorization code flow based on the information of the back-end application 43. When the authorization code is received from the external service, the processor 31 causes the front-end application 42 to redirect using the URL (redirect URL) previously associated with the back-end application 43 on the external service. Furthermore, the processor 31 acquires the access token from the external service by the back-end application 43 using the authorization code received from the external service.

Accordingly, the front-end application 42 can be configured not to directly cooperate with a specific external service. Further, by the processor 31 operating as described above, the back-end application 43 having no UI can be registered in the external service. As a result, the back-end application 43 is registered in the external service, and various front-end applications 42 can request the execution of the function of the external service to the back-end application 43. In other words, the front-end application 42 does not need to have a predetermined configuration in response to the external service. Accordingly, the versatility of the front-end application 42 can be improved, and the convenience of the information processing apparatus can be improved.

Further, the back-end application 43 has information on the authorization code flow start URL of the external service and the client secret ID. When the start of the authorization code flow is requested from the front-end application 42, the processor 31 causes the external service to execute the authorization code flow using the authorization code flow start URL of the back-end application 43. When the processor 31 receives the authorization code from the external service, the processor 31 can acquire the access token from the external service by the back-end application 43 using the client secret ID of the back-end application 43.

Further, the processor 31 can cause the back-end application 43 to execute the transmission of the access token and the function execution request to the external service in response to the function execution request from the front-end application 42 to the back-end application 43.

Further, the processor 31 causes the memory 32 to store the session state (identifier or the like of the front-end application) before accessing the authorization code flow start URL. Accordingly, the processor 31 can restore the stored session state after the completion of the authorization code flow.

In addition, the back-end application 43 may be configured to support a plurality of external services. For example, the back-end application 43 may be configured to hold the authorization code flow start URL and the client secret ID for each external service (or each function) in another location instead of the meta property. In this case, the back-end application 43 outputs the authorization code flow start URL and the client secret ID in response to the function execution request from the front-end application 42 or the request from the application framework 44. With this configuration, the back-end application 43 can dynamically switch the information to be output in response to the request.

The functions described in each of the above-described embodiments are not limited to being configured by using hardware, and can also be implemented by using software to read a program describing each function into a computer. Further, each function may be configured by appropriately selecting either software or hardware.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a communication interface configured to communicate with an external service including an authorization code flow;
a memory configured to store a front-end application comprising a user interface (UI) and a back-end application without a UI and registered in the external service; and
a processor configured to:
cause the external service to execute the authorization code flow based on information relating to and received from the back-end application in response to a request from the front-end application, the information including an authorization code flow start uniform resource locator (URL) and a secret identifier (ID) of the external service,
receive an authorization code from the external service,
cause the front-end application to redirect the authorization code flow using a URL previously associated with the back-end application on the external service, and
acquire an access token from the external service by the back-end application using the authorization code,
the processor being further configured to cause the external service to execute the authorization code flow at a time when the authorization code flow is requested from the front-end application using the authorization code flow start URL of the back-end application.

2. The information processing apparatus according to claim 1, wherein the request is a function execution request configured to cause the back-end application to transmit the access token and the function execution request to the external service when executed by the processor.

3. The information processing apparatus according to claim 1, wherein the processor is further configured to:
store a session state before start of the authorization code flow, and
cause the front-end application to redirect an authorization code flow start URL based on the stored session state after completion of the authorization code flow.

4. The information processing apparatus according to claim 1, wherein the back-end application is configured to communicate with a plurality of external services and store an authorization code flow start URL and a client secret ID for each of the plurality of external services.

5. The information processing apparatus according to claim 1, wherein the processor is further configured to:
determine whether the request includes the authorization code, and
responsive to the determining the request does not include the authorization code, cause the external service to execute the authorization code flow.

6. The information processing apparatus according to claim 1, wherein the memory is further configured to store an application framework configured to generate an authorization code flow start preparation URL.

7. An information processing apparatus comprising:
a communication interface configured to communicate with an external service including an authorization code flow;
a memory configured to store a front-end application comprising a user interface (UI) and a back-end application without a UI and registered in the external service; and
a processor configured to:
cause the external service to execute the authorization code flow based on information relating to and received from the back-end application in response to a request from the front-end application, the information including an authorization code flow start uniform resource locator (URL) and a secret identifier (ID) of the external service,
receive an authorization code from the external service,
cause the front-end application to redirect the authorization code flow using a URL previously associated with the back-end application on the external service, and
acquire an access token from the external service by the back-end application using the authorization code,
the processor being further configured to acquire the access token from the external service via the back-end application using the secret ID of the back-end application when the authorization code is received.

8. A method for controlling an information processing apparatus including a communication interface for communicating with an external service including an authorization code flow, a processor, and a memory, the method comprising:
storing, by the memory, a front-end application comprising a user interface (UI) and a back-end application without a UI and registered in the external service;
causing, by the processor, the external service to execute the authorization code flow based on information relating and received from to the back-end application in response to a request from the front-end application, wherein the information includes an authorization code flow start uniform resource locator (URL) and a secret identifier (ID) of the external service, receiving, by the processor, an authorization code from the external service, causing, by the processor, the front-end application to redirect the authorization code flow using a URL previously associated with the back-end application on the external service, and acquiring, by the processor, an access token from the external service by the back-end application using the authorization code, wherein at least one of:

causing the external service to execute the authorization code flow further occurs at a time when the authorization code flow is requested from the front-end application and comprises using the authorization code flow start URL of the back-end application; or acquiring the access token from the external service via the back-end application comprises using the secret ID of the back-end application when the authorization code is received.

9. The method according to claim 8, wherein causing the external service to execute the authorization code flow further occurs at a time when the authorization code flow is requested from the front-end application and comprises using the authorization code flow start URL of the back-end application.

10. The method according to claim 8, wherein acquiring the access token from the external service via the back-end application comprises using the secret ID of the back-end application when the authorization code is received.

11. The method according to claim 8, further comprising causing the back-end application to transmit the access token and a function execution request to the external service when executed by the processor, the request comprising the function execution request.

12. The method according to claim 8, further comprising:

storing, by the memory, a session state before start of the authorization code flow, and causing the front-end application to redirect an authorization code flow start URL based on the stored session state after completion of the authorization code flow.

13. The method according to claim 8, further comprising:

communicating, by the processor via the back-end application, with a plurality of external services; and storing, by the memory, an authorization code flow start URL and a client secret ID for each of the plurality of external services.

14. The method according to claim 8, further comprising:

determining, by the processor, whether the request includes the authorization code, and responsive to the determining the request does not include the authorization code, causing the external service to execute the authorization code flow.

15. The method according to claim 8, further comprising generating, an authorization code flow start preparation URL.

* * * * *